(12) United States Patent
Liang et al.

(10) Patent No.: US 11,795,029 B1
(45) Date of Patent: Oct. 24, 2023

(54) INTEGRATED SPIRAL AND HOOPING WINDING EQUIPMENT FOR MULTI-BUNDLE FIBERS

(71) Applicant: Taiyuan University of Technology, Taiyuan (CN)

(72) Inventors: Jianguo Liang, Taiyuan (CN); Qingxue Huang, Taiyuan (CN); Yujie Duan, Taiyuan (CN); Yinhui Li, Taiyuan (CN); Chunjiang Zhao, Taiyuan (CN); Jianglin Liu, Taiyuan (CN); Lianyun Jiang, Taiyuan (CN); Yanchun Zhu, Taiyuan (CN); Xiaodong Zhao, Taiyuan (CN); Hui Li, Taiyuan (CN)

(73) Assignee: TAIYUAN UNIVERSITY OF TECHNOLOGY, Taiyuan (CN)

( * ) Notice: Subject to any disclaimer, the term of this patent is extended or adjusted under 35 U.S.C. 154(b) by 0 days.

(21) Appl. No.: 18/325,231

(22) Filed: May 30, 2023

(30) Foreign Application Priority Data

Dec. 16, 2022 (CN) .......................... 202211618858.5

(51) Int. Cl.
*B65H 54/00* (2006.01)
*B65H 54/20* (2006.01)
(Continued)

(52) U.S. Cl.
CPC ............. *B65H 54/20* (2013.01); *B65H 54/04* (2013.01); *B65H 54/74* (2013.01); *B65H 2701/314* (2013.01)

(58) Field of Classification Search
CPC ........ B65H 54/04; B65H 54/20; B65H 54/74; B65H 2701/314; B29C 53/56; B29C 53/562; B29C 53/602; B29C 53/665
See application file for complete search history.

(56) References Cited

U.S. PATENT DOCUMENTS

| | | | |
|---|---|---|---|
| 2012/0037745 A1* | 2/2012 | Aiyama | B29C 53/605 242/430 |
| 2015/0153002 A1* | 6/2015 | Tanabe | B29C 53/602 156/64 |

(Continued)

OTHER PUBLICATIONS

Search Report issued in Chinese Application No. 202211618858.5; dated Jan. 12, 2023; 7 pgs.

(Continued)

*Primary Examiner* — Emmanuel M Marcelo
(74) *Attorney, Agent, or Firm* — HAUPTMAN HAM, LLP

(57) ABSTRACT

Carbon fiber winding equipment includes integrated spiral and hooping winding equipment for multi-bundle fibers. The equipment includes a spiral winding unit, a hoop winding unit, and a guide base and a supporting base for supporting the spiral winding unit and the hoop winding unit. An end face of a gear driving plate includes a continuous bulbous iris curve sliding rail, a sliding rod extends into the sliding rail and is capable of driving a yarn guide shaft tube to slide radially along with the rotation of the gear driving plate. A bevel gear is capable of driving the yarn guide shaft tube to do auto-rotation motion along with the rotation of a second transmission gear ring. A ratchet driving plate rotates to drive an electric telescopic rod to push a hoop rotation plate to rotate so as to drive a hoop winding bundling device to complete a hoop winding action.

7 Claims, 5 Drawing Sheets

(51) Int. Cl.
    *B65H 54/74*         (2006.01)
    *B65H 54/04*         (2006.01)

(56) References Cited

U.S. PATENT DOCUMENTS

| | | | |
|---|---|---|---|
| 2015/0329315 A1* | 11/2015 | Hatta | B65H 81/00 |
| | | | 242/436 |
| 2016/0339650 A1* | 11/2016 | Ueda | B29C 70/865 |
| 2018/0283609 A1* | 10/2018 | Teruhira | B29C 53/582 |
| 2019/0168989 A1* | 6/2019 | Kobayashi | B65H 54/44 |
| 2020/0001519 A1* | 1/2020 | Tanigawa | B65H 67/02 |
| 2020/0070401 A1* | 3/2020 | Iida | B29C 63/0073 |
| 2020/0282633 A1* | 9/2020 | Hatta | B29C 53/845 |
| 2021/0078238 A1* | 3/2021 | Katano | B29C 53/566 |
| 2021/0215293 A1* | 7/2021 | Inoue | B29C 53/66 |
| 2021/0283825 A1* | 9/2021 | Tatsushima | B29C 53/8016 |
| 2021/0370577 A1* | 12/2021 | Hatta | B29C 53/602 |
| 2022/0252493 A1* | 8/2022 | Nakanishi | G01N 9/00 |
| 2022/0299162 A1* | 9/2022 | Tatsushima | F17C 1/06 |
| 2022/0397471 A1* | 12/2022 | Satoya | G01L 5/0076 |
| 2023/0081419 A1* | 3/2023 | VanOyen | F17C 1/06 |
| | | | 220/581 |
| 2023/0119246 A1* | 4/2023 | Kobayashi | F17C 1/06 |
| | | | 220/516 |

OTHER PUBLICATIONS

First Office Action issued in Chinese Application No. 202211618858.5; dated Jan. 28, 2023; 11 pgs.
Notice of Grant issued in Chinese Application No. 202211618858.5; dated Feb. 16, 2023; 3 pgs.

\* cited by examiner

INTEGRATED SPIRAL AND HOOPING WINDING EQUIPMENT FOR MULTI-BUNDLE FIBERS

RELATED APPLICATIONS

The present application claims priority from Chinese Application Number 202211618858.5 filed Dec. 16, 2022, the disclosure of which is hereby incorporated by reference herein in its entirety.

TECHNICAL FIELD

The present invention belongs to the technical field of carbon fiber winding equipment, and in particular to integrated spiral and hooping winding equipment for multi-bundle fibers.

BACKGROUND

Hydrogen energy is not only environmentally-friendly energy, but also ideal energy required by human beings. The large-scale popularization of the hydrogen energy mainly involves three important links: production, storage and transportation, and application. How to ensure the high efficiency and safety of a hydrogen storage technology is a key technology affecting the popularization and application of the hydrogen energy, and is also a key problem to be solved urgently at present. High-pressure hydrogen storage is generally considered as a promising hydrogen storage technology. The manufacturing and development of a high-pressure hydrogen storage vessel that serves as the main storage means of hydrogen energy determines the popularization speed of the hydrogen energy. The high-pressure hydrogen storage vessel includes a III type vessel and a IV type vessel, and takes a carbon fiber composite material layer as a main carrier of the pressure vessel, so that the safety performance can be ensured. The carbon fiber composite material layer of the high-pressure energy storage vessel mostly adopts a fiber winding process. According to the process requirements, the current mature winding forming process method includes a spiral winding process and a hoop winding process.

The current mainstream fiber winding method is to wind single tow or multiple tows at the same time. Single-bundle winding has low winding efficiency, and the performance of the carbon fiber composite material layer is greatly affected due to the stress concentration phenomenon caused by fiber crossing overhead. The efficiency of multi-bundle winding is improved, but there are still some problems of high equipment development cost and insufficient modular design. Due to the characteristics of high structural strength requirement, high production cost and large demand of mass production, higher requirements are put forward for the development of high-pressure hydrogen storage vessel manufacturing equipment. At present, multi-bundle winding equipment is little developed in China, multi-bundle winding equipment is generally divided into spiral winding equipment and hoop winding, and multi-bundle spiral winding and hoop winding equipment are separated, resulting in large occupied space, more degrees of freedom, complicated control and winding efficiency to be improved.

SUMMARY

To solve the problems of large occupied space, more degrees of freedom, complicated control and winding efficiency to be improved due to separation of multi-bundle spiral winding equipment and hoop winding equipment, the present invention provides integrated spiral and hooping winding equipment for multi-bundle fibers, which couples a spiral winding unit and a hoop winding unit, thereby improving the winding efficiency.

The present invention is implemented by the following technical solution: integrated spiral and hooping winding equipment for multi-bundle fibers includes a spiral winding unit, a hoop winding unit, and a guide base and a supporting base for supporting the spiral winding unit and the hoop winding unit, where the guide base includes a ring-shaped guide plate and a ring-shaped cylinder that are coaxially and fixedly connected to each other, the supporting base is anchored on the ground and includes a first machine frame plate and a second machine frame plate that are arranged oppositely, the first machine frame plate and the second machine frame plate are provided with circular channels that are arranged coaxially, and an end face of one side of the ring-shaped guide plate is fixedly connected to an inner side of the first machine frame plat; the spiral winding unit includes a first transmission gear ring, a second transmission gear ring, a gear driving plate, and a plurality of fiber feeding mechanisms arranged along a circumferential array of the ring-shaped guide plate, each of the fiber feeding mechanisms includes a yarn guide shaft tube, a sliding rod, a limiting bearing, a bevel gear, a silk outlet head and a limiting tube, the ring-shaped guide plate is provided with several guide grooves for the yarn guide shaft tube to slide in a radial direction of the ring-shaped guide plate, the yarn guide shaft tube is axially provided with a key groove in sliding fit with the bevel gear, the bevel gear is in key connection with the yarn guide shaft tube and located on an inner side of the ring-shaped guide plate, an outer ring of the limiting bearing is fixed at an inner side end of each of the guide grooves, one end of the bevel gear is fixedly connected to an inner ring of the limiting bearing, the yarn guide shaft tube is arranged in each of the guide grooves and is movably connected to the inner ring of the limiting bearing, the limiting tube is arranged at a middle part of the yarn guide shaft tube, the sliding rod is fixedly connected to the limiting tube, the yarn guide shaft tube is axially fixed relative to the limiting tube and rotates circumferentially, the silk outlet head is connected to a front end of the yarn guide shaft tube, and each of the first transmission gear ring and the second transmission gear ring is driven by a driving mechanism to rotate; an end face of one side, away from the first machine frame plate, of the ring-shaped guide plate is rotatably connected to the first transmission gear ring through a rotary supporting base, the gear driving plate is rotatably arranged on the ring-shaped cylinder and located on an inner side of the first transmission gear ring, a plurality of forward rotation pawls and electromagnetic pressure springs are arranged on one side, in fit with the gear driving plate, of an inner ring of the first transmission gear ring at intervals in a circumferential direction, an outer gear ring of the gear driving plate is in fit transmission with the first transmission gear ring through the forward rotation pawls, the forward rotation pawls are capable of being engaged with or disengaged from the gear driving plate under the action of the electromagnetic pressure spring, an end face of the gear driving plate is provided with a continuous bulbous iris curve sliding rail, and the sliding rod extends into the sliding rail and is capable of driving the yarn guide shaft tube to slide radially along with the rotation of the gear driving plate; the second transmission gear ring is located on an outer side of the first machine frame plate, an end face of the second transmission gear ring is fixedly connected to a gear cylinder, the gear cylinder is rotatably connected to the ring-shaped guide plate through a supporting bearing, the supporting bearing is located on an end face of one side, away from the first transmission gear ring, of the ring-shaped guide plate, one end, away from the second transmission gear ring, of the gear cylinder is provided with a gear ring engaged with the bevel gear, and the bevel gear is capable of driving the yarn guide shaft tube to do auto-rotation motion along with the rotation of the second transmission gear ring; the hoop winding unit includes a ratchet driving plate, a hoop rotation plate, a T-shaped sleeve, a hoop winding bundling device, an electric telescopic rod, a yarn guide roller and a fiber yarn roll, the ratchet driving plate is rotatably arranged on the ring-shaped cylinder and is spaced from the gear driving plate through the T-shaped sleeve, the hoop winding unit and the spiral winding unit share one first transmission gear ring, a plurality of reverse rotation pawls and electromagnetic pressure springs are arranged on one side, in fit with the ratchet driving plate, of an inner ring of the first transmission gear ring, a gear ring on an end face of the ratchet driving plate is in fit transmission with the first transmission gear ring through the reverse rotation pawls, and the reverse rotation pawls are capable of being engaged with or disengaged from the ratchet driving plate under the action of the electromagnetic pressure springs; and several rolling wheels are arranged at the periphery of the circular channel of the second machine frame plate in a circumferential array, the hoop rotation plate is rotatably connected to an outer side of the second machine frame plate through the rolling wheels, one end of the electric telescopic rod is fixedly connected to the ratchet driving plate and the other end of the electric telescopic rod extends out of the hoop rotation plate to be connected to the hoop winding bundling device, the yarn guide roller and the fiber yarn roll are arranged on an end face of one side, close to the ratchet driving plate, of the hoop rotation plate, the electric telescopic rod drives the hoop winding bundling device to extend to a working position, and the ratchet driving plate rotates to drive the electric telescopic rod to push the hoop rotation plate to rotate, so as to drive the hoop winding bundling device to complete hooping winding action.

Preferably, the hoop winding bundling device includes a bundling bracket, a gum dipping groove, yarn guide combs, a gum dipping roller and a yarn guide support, the bundling bracket is fixedly connected to one end of the electric telescopic rod, two yarn guide combs are respectively arranged at a front end and a rear end of the bundling bracket, a yarn guide hole is formed in a lower part of a front end of the bundling bracket, the gum dipping roller is rotatably arranged on the bundling bracket, the gum dipping groove is formed on the bundling bracket below the gum dipping roller, the yarn guide support is fixedly connected to one end, close to the electric telescopic rod, of the bundling bracket, the yarn guide support is provided with a yarn guide hole, and fiber tows are transmitted to the yarn guide hole on the yarn guide support through the yarn guide roller, are split by the yarn guide combs, are subjected to gum dipping by the gum dipping roller, and are supplied for hoop winding.

Preferably, one end of the limiting tube extends inwards to form a limiting clamping ring, and a ring-shaped groove is formed at a position, corresponding to the limiting clamping ring, of the yarn guide shaft tube.

Preferably, the bevel gear and the inner ring of the limiting bearing are fixed through a connecting sleeve, and yarn guide channels are formed in the yarn guide shaft tube and the silk outlet head and communicate with each other.

Preferably, the yarn guide roller and the fiber yarn roll are perpendicular to the hoop rotation plate, a plurality of yarn guide rollers and a plurality of fiber yarn rolls are arranged on the hoop winding rotation plate in a circumferential array, and the ratchet driving plate and the hoop rotation plate are provided with a plurality of closed notches.

Preferably, the second transmission gear ring, the ring-shaped guide plate, the gear driving plate, the ratchet driving plate, the first transmission gear ring and the hoop rotation plate are arranged coaxially and are all provided with circular channels for a high-pressure hydrogen storage vessel to pass through.

Preferably, driving mechanisms of the first transmission gear ring and the second transmission gear ring are worm driving assemblies; each of the worm driving assemblies includes a worm, a servo motor and a carrying base; and the carrying base at the worm engaged with the first transmission gear ring is anchored on the ground, and the carrying base at the worm engaged with the second transmission gear ring is fixedly connected to an outer wall of the first machine frame plate.

Preferably, an outer ring of the rotary supporting base is fixedly connected to the first transmission gear ring, and an inner ring of the rotary supporting base is rotatably connected to the ring-shaped guide plate through a driving gearing.

Compared with the prior art, the present invention has the following beneficial effects:

1. According to the present invention, the integrated design of spiral winding and hoop winding equipment is realized, so that the spiral and hoop winding equipment has a higher mechanism coupling degree, the winding efficiency can be improved, the use amount of fiber, the occupied space of the equipment and the production cost can be reduced, and a new solution is provided to manufacture a high-pressure hydrogen storage vessel through carbon fiber composite material winding.

2. According to the present invention, the gear driving plate with the continuous bulbous iris curve sliding rail on the end face drives spiral winding silk outlet heads on several fiber feeding mechanisms to perform synchronous radial feeding; by adoption of the continuous curve groove design in the structural characteristic, the control precision of feeding movement can be improved, mechanical vibration of general gear engaged transmission is avoided, the silk outlet head performs radial feeding movement more smoothly; and by adoption of the gear plate modular design, the equipment can change parts for the hydrogen storage cylinders with different thickness, and the development cost of the equipment is reduced.

3. According to the present invention, the gear cylinder is engaged to drive the bevel gears distributed circumferentially and uniformly, thereby ensuring the auto-rotation of the spiral winding yarn guide shaft tube to be synchronous, and realizing synchronous rotation of spiral winding multi-bundle silk outlet heads; and the design of the yarn guide shaft tube with the limiting key groove ensures that the radial feeding and rotation motion of the silk outlet heads do not affect each other during spiral winding.

4. Due to the double-layer reverse ratchet design of the present invention, the hoop winding unit and the spiral winding unit share one first transmission gear ring, and the forward rotation pawls and the reverse rotation pawls with the electromagnetic pressure springs are respectively arranged on the first transmission gear ring and respectively control the rotation of the gear driving plate and the ratchet driving plate; during spiral winding, the electromagnetic pressure springs control the forward rotation pawls to be pressed down and engaged with teeth at the outer side of the gear driving plate, and the first transmission gear ring performs forward rotation to drive the gear driving plate to rotate so as to drive several fiber feeding mechanisms to do synchronous radial movement; and during hoop winding, the electromagnetic pressure springs control the reverse rotation pawls to be pressed down and engaged with the outer side of the ratchet driving plate, the first transmission gear ring performs reverse rotation to drive the ratchet driving plate to rotate so as to drive the hoop winding bundling device to do rotation movement, the two motion processes are independent of each other, the movement mechanism shares one motor, and the motor cost is saved.

5. According to the present invention, the first transmission gear ring and the ratchet driving plate are in engaged transmission to drive the hoop winding bundling device to rotate and cooperate with the axial feeding movement of the electric telescopic rod device to complete hoop winding action; the electric telescopic rod drives the hoop rotation plate to rotate together, thereby ensuring smooth yarn output of the fiber yarn roll on the hoop rotation plate and avoiding the skein phenomenon; and through mechanical coupling and structure innovation, the winding method without yarn breaking winding is broken through, the problem of separation of existing multi-bundle spiral and hoop winding process equipment is solved, the winding efficiency is greatly improved, the occupied space and the manufacturing cost of the equipment are reduced, and the prevent invention is a currently feasible solution of solving the defect of the current spiral and hoop winding process.

BRIEF DESCRIPTION OF DRAWINGS

To describe the technical solutions in the embodiments of the present invention or in the prior art more clearly, the accompanying drawings required for the embodiments will be briefly described below. Apparently, the accompanying drawings in the following description show merely some embodiments of the present invention, and a person of ordinary skill in the art may still derive other accompanying drawings from these accompanying drawings without creative efforts.

Figure 1:
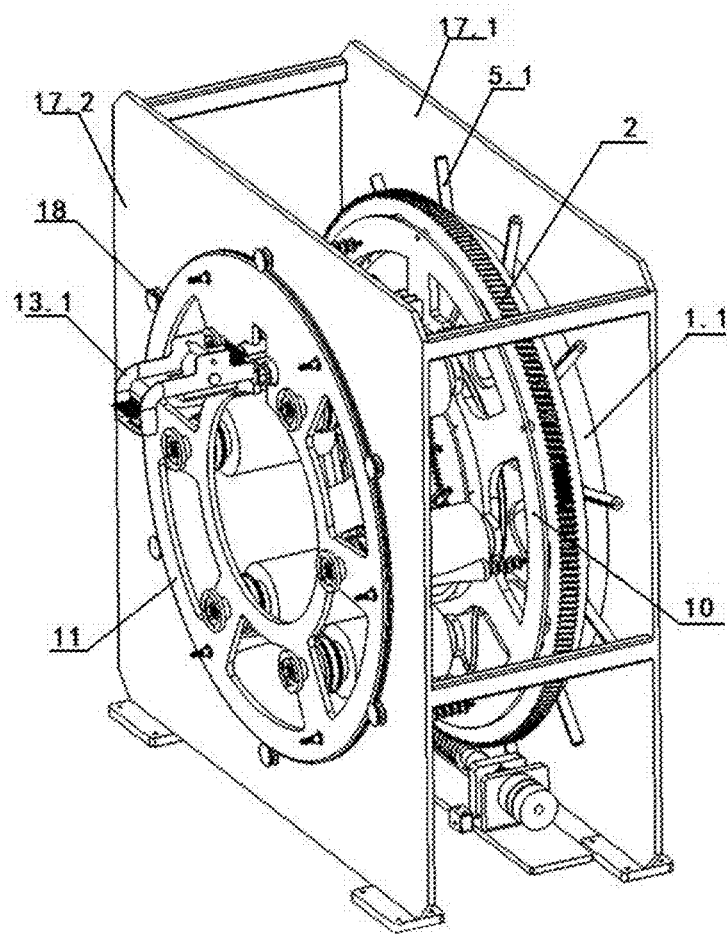
FIG. 1 is a schematic diagram of an overall structure according to this embodiment.

In the drawings: 1-guide base; 1.1-ring-shaped guide plate; 1.2-ring-shaped cylinder; 1.11-guide groove; 2-first transmission gear ring; 3-second transmission gear ring; 4-gear driving plate; 5.1-yarn guide shaft tube; 5.11-ring-shaped groove; 5.2-sliding rod; 5.3-positioning bearing; 5.4-bevel gear; 5.5-silk outlet head; 5.6-limiting tube; 5.61-limiting clamping ring; 5.7-connecting sleeve; 6-rotary supporting base; 7.1-forward rotation pawl; 7.2-reverse rotation ratchet; 8-electromagnetic pressure spring; 9-gear cylinder; 10-ratchet driving plate; 11-hoop rotation plate; 12-T-shaped sleeve; 13.1-bundling bracket; 13.2-gum dipping groove; 13.3-yarn guide comb; 13.4-gum dipping roller; 13.5-yarn guide bracket; 14-electric telescopic rod; 15-yarn guide roller; 16-fiber yarn roll; 17.1-first machine frame plate; 17.2-second machine frame plate; 18-rolling wheel; 19-driving bearing; 20-supporting bearing; 21-hydrogen storage vessel; 22-hydrogen storage vessel feeding mechanism.

DETAILED DESCRIPTION OF ILLUSTRATIVE EMBODIMENTS

The technical solutions in the embodiments of the present invention are described clearly and completely with reference to the accompanying drawings in the embodiments of the present invention. Apparently, the described embodiments are merely some rather than all of the embodiments of the present invention. All other embodiments obtained by a person of ordinary skill in the art based on the embodiments of the present invention without creative efforts should fall within the protection scope of the present invention.

It should be noted that the structure, scale, size, etc. shown in the drawings of the specification are only used to cooperatively describe the content disclosed by the specification for those skilled in the art to understand and read, and are not intended to limit the implementation of the present invention. Therefore, it has no technical substantive significance. Any structural modification, change of a scale relationship or adjustment of size should still fall within the scope which can be covered by the technical content disclosed by the present invention without affecting the effects and the objective achieved by the present invention. It should be noted that in this specification, relationship terms such as first and second are only used to distinguish one entity from several other entities, and do not necessarily require or imply the presence of any such actual relationship or sequence between these entities.

Figure 2:
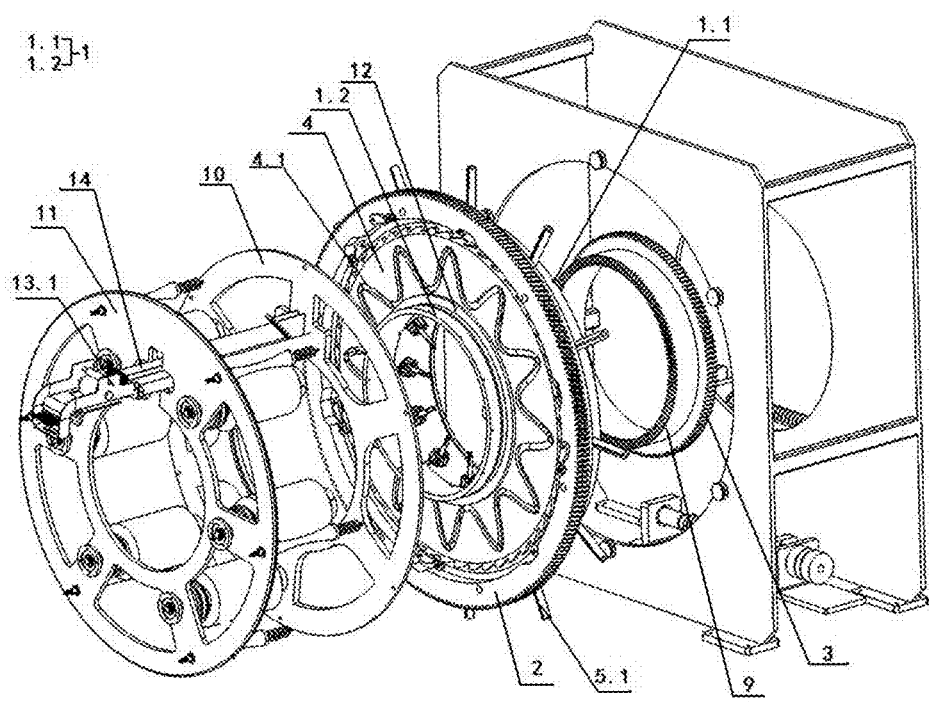
FIG. 2 is a schematic exploded view of an overall structure according to this embodiment.

The present invention provides an embodiment:

as shown in FIG. 1 and FIG. 2, integrated spiral and hooping winding equipment for multi-bundle fibers includes a spiral winding unit, a hoop winding unit, and a guide base 1 and a supporting base for supporting the spiral winding unit and the hoop winding unit, where the guide base 1 includes a ring-shaped guide plate 1.1 and a ring-shaped cylinder 1.2 that are coaxially and fixedly connected to each other, the supporting base is anchored on the ground and includes a first machine frame plate 17.1 and a second machine frame plate 17.2 that are arranged in parallel, the first machine frame plate and the second machine frame plate are provided with circular channels that are arranged coaxially, a supporting rib is connected between the first machine frame plate and the second machine frame plate, and an end face of one side of the ring-shaped guide plate 1.1 is fixedly connected to an inner side of the first machine frame plate 17.1.

Figure 6:
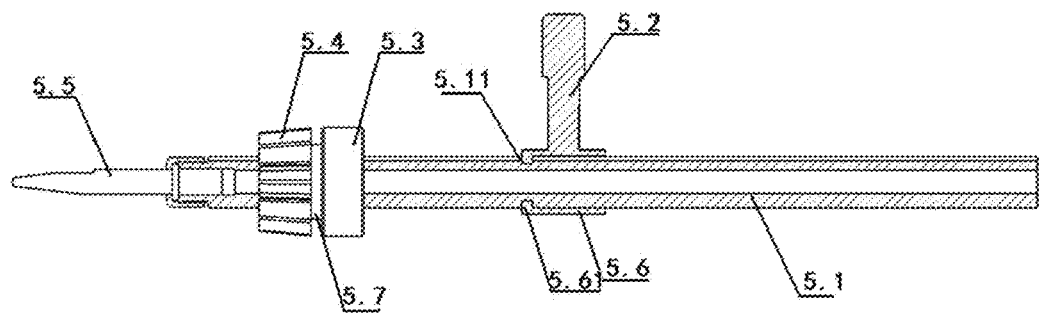
FIG. 6 is a structural schematic diagram of a fiber feeding mechanism according to this embodiment.
Figure 7:
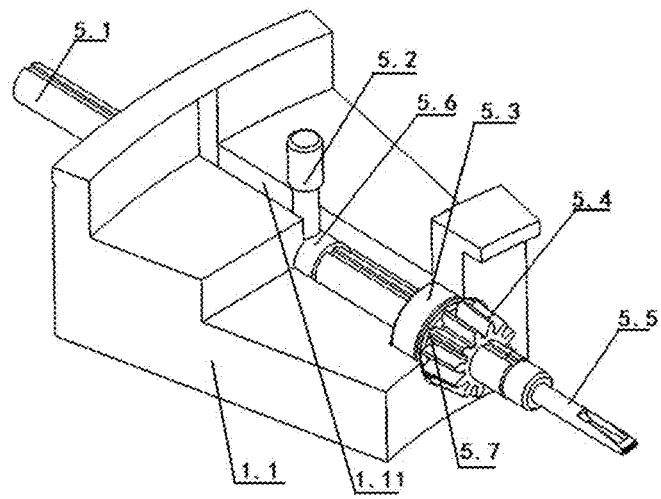
FIG. 7 is a mounting structural diagram of a fiber feeding mechanism according to this embodiment.

The spiral winding unit includes a first transmission gear ring 2, a second transmission gear ring 3, a gear driving plate 4, a plurality of fiber feeding mechanisms arranged along a circumferential array of the ring-shaped guide plate 1.1, as shown in FIG. 6 and FIG. 7, each of the fiber feeding mechanisms includes a yarn guide shaft tube 5.1, a sliding rod 5.2, a limiting bearing 5.3, a bevel gear 5.4, a silk outlet head 5.5 and a limiting tube 5.6, the ring-shaped guide plate 1.1 is provided with several guide grooves 1.11 for the yarn guide shaft tube 5.1 to slide in a radial direction of the ring-shaped guide plate 1.1, the yarn guide shaft tube 5.1 is axially provided with a key groove in sliding fit with the bevel gear 5.4, the bevel gear 5.4 is in key connection with the yarn guide shaft tube 5.1 and located on an inner side of the ring-shaped guide plate 1.1, an outer ring of the limiting bearing 5.3 is fixed at an inner side end of each of the guide grooves 1.11, the bevel gear 5.4 and an inner ring of the limiting bearing 5.3 are fixed through a connecting sleeve 5.7, rotation of the bevel gear is ensured while the bevel gear 5.4 is positioned, the yarn guide shaft tube 5.1 is arranged in the guide groove 1.11 and movably penetrates into the inner ring of the limiting bearing 5.3, two ends of the yarn guide shaft tube 5.1 extend out of the guide groove 1.11, the limiting tube 5.6 is arranged at a middle part of the yarn guide shaft tube 5.1, the sliding rod 5.2 is fixedly connected to the limiting tube 5.6, the yarn guide shaft tube 5.1 is axially fixed relative to the limiting tube 5.6 and rotates circumferentially, one end of the limiting tube 5.6 extends inwards to form a limiting clamping ring 5.61, and the yarn guide shaft tube 5.1 is provided with a ring-shaped groove 5.11 corresponding to the position of the limiting clamping ring 5.61; the silk outlet head 5.5 is connected to a front end of the yarn guide shaft tube 5.1, and yarn guide channels are formed in the yarn guide shaft tube 5.1 and the silk outlet head 5.2 and communicate with each other; each of the first transmission gear ring 2 and the second transmission gear ring 3 is driven by a driving mechanism to rotate; and the driving mechanisms of the first transmission gear ring 2 and the second transmission gear ring 3 are worm driving assemblies, each of the worm driving assemblies includes a worm, a servo motor and a carrying base, the carrying base at the worm engaged with the first transmission gear ring 2 is anchored on the ground, and the carrying base at the worm engaged with the second transmission gear ring 3 is fixedly connected to an outer wall of the first machine frame plate 17.1.

Figure 3:
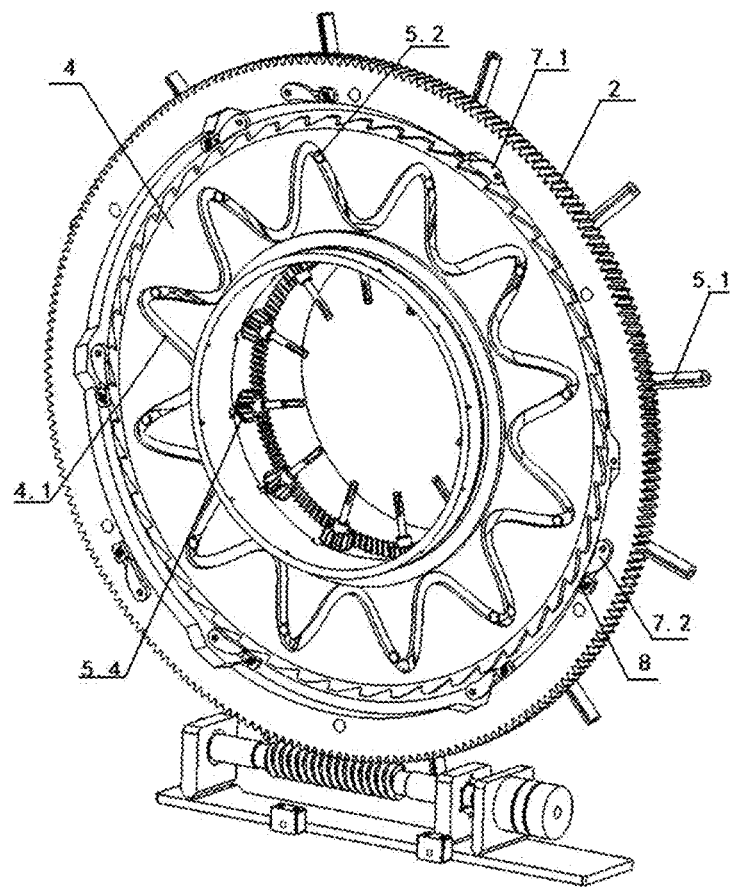
FIG. 3 is a structural schematic diagram of a gear driving plate according to this embodiment.
Figure 4:
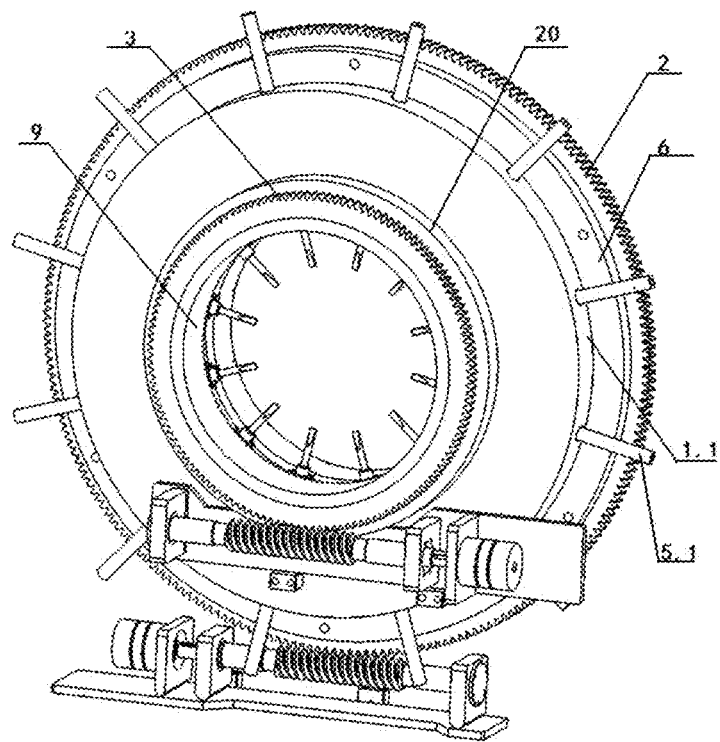
FIG. 4 is a structural schematic diagram of a second transmission gear ring according to this embodiment.
Figure 5:
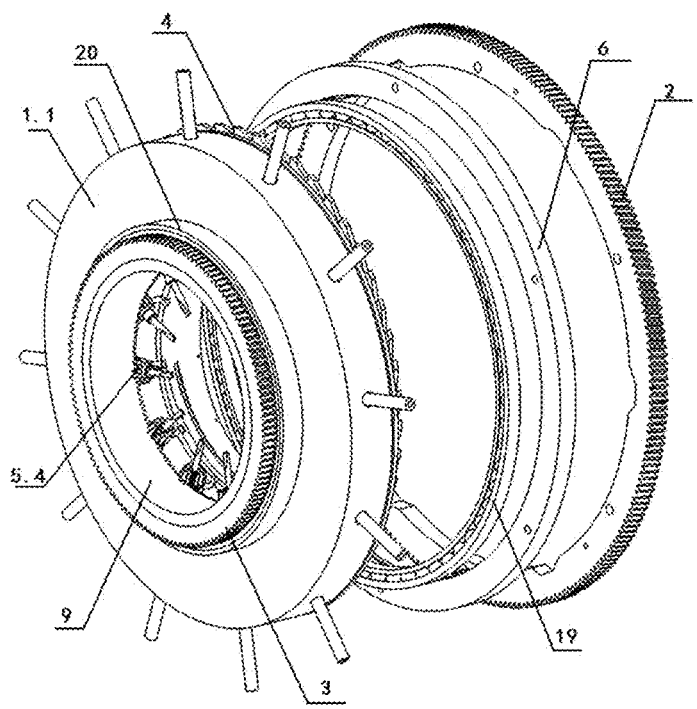
FIG. 5 is a schematic exploded view of a rotary supporting base according to this embodiment.

As shown in FIG. 3, FIG. 4 and FIG. 5, an end face of one side, away from the first machine frame plat e17.1, of the ring-shaped guide plate 1.1 is rotatably connected to the first transmission gear ring 2 through a rotary supporting base 6, an outer ring of the rotary supporting base 6 is fixedly connected to the first transmission gear ring 2, and an inner ring of the rotary supporting base 6 is rotatably connected to the ring-shaped guide plate 1.1 through a driving bearing 19; the gear driving plate 4 is rotatably arranged on the ring-shaped cylinder 1.2 and located on an inner side of the first transmission gear ring 2, a plurality of forward rotation pawls 7.1 and electromagnetic pressure springs 8 are arranged on one side, in fit with the gear driving plate 4, of an inner ring of the first transmission gear ring 2 at intervals in a circumferential direction, an outer gear ring of the gear driving plate 4 is in fit transmission with the first transmission gear ring 2 through the forward rotation pawls 7.1, the forward rotation pawls 7.1 are capable of being engaged with or disengaged from the gear driving plate 4 under the action of the electromagnetic pressure springs 8, and the inner ring of the first transmission gear ring 2 is provided with a pawl groove corresponding to the position of the pawl; an end face of the gear driving plate 4 is provided with a continuous bulbous iris curve sliding rail 4.1, the continuous bulbous iris curve sliding rail 4.1 is of a continuous waveform and includes a plurality of continuous peaks and valleys, one sliding rod 5.2 is correspondingly arranged between two adjacent peaks, and the sliding rod 5.2 extends into the sliding rail and is capable of driving the yarn guide shaft tube 5.1 to slide radially along with the rotation of the gear driving plate 4; the second transmission gear ring 3 is located on an outer side of the first machine frame plate 17.1, an end face of the second transmission gear ring 3 is fixedly connected to a gear cylinder 9, the gear cylinder 9 is rotatably connected to the ring-shaped guide plate 1.1 through a supporting bearing 20, the supporting bearing 10 is located on an end face of one side, away from the first transmission gear ring 2, of the ring-shaped guide plate 1.1, one end, away from the second transmission gear ring 3, of the gear cylinder 9 is provided with a gear ring engaged with the bevel gear 5.4, and the bevel gear 5.4 is capable of driving the yarn guide shaft tube 5.1 to do auto-rotation motion along with the rotation of the second transmission gear ring 3; and all the yarn guide shaft tubes 5.1 do synchronous radial movement and auto-rotation motion.

Figure 8:
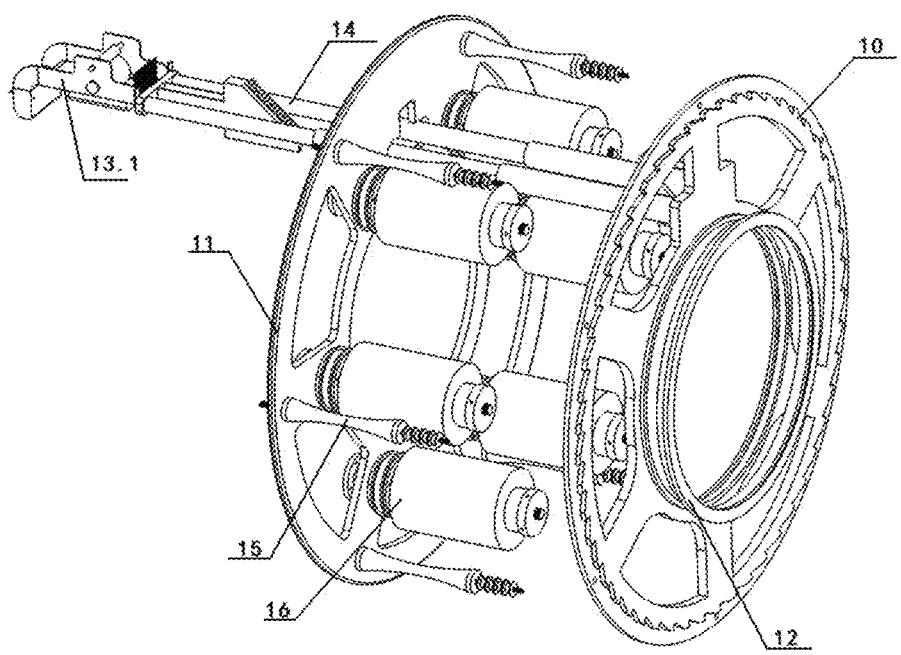
FIG. 8 is a structural schematic diagram of a hoop winding unit according to this embodiment.

As shown in FIG. 8, the hoop winding unit includes a ratchet driving plate 10, a hoop rotation plate 11, a T-shaped sleeve 12, a hoop winding bundling device, an electric telescopic rod 14, a yarn guide roller 15 and a fiber yarn roll 16, the ratchet driving plate 10 is rotatably arranged on the ring-shaped cylinder 1.2 and is spaced from the gear driving plate 4 through the T-shaped sleeve 12, the gear driving plate 4 and the ratchet driving plate 10 are axially fixed relative to the ring-shaped cylinder 1.2, rotate circumferentially and are located in the inner ring of the first transmission gear ring 2, the hoop winding unit and the spiral winding unit share one first transmission gear ring 2, a plurality of reverse rotation pawls 7.2 and electromagnetic pressure springs 8 are arranged on one side, in fit with the ratchet driving plate 10, of an inner ring of the first transmission gear ring 2, a gear ring on an end face of the ratchet driving plate 10 is in fit transmission with the first transmission gear ring 2 through the reverse rotation pawls 7.2, and the reverse rotation pawls 7.2 are capable of being engaged with or disengaged from the ratchet driving plate 10 under the action of the electromagnetic pressure springs 8; and several rolling wheels 18 are arranged at the periphery of the circular channel of the second machine frame plate 17.2 in a circumferential array, the hoop rotation plate 11 is rotatably connected to an outer side of the second machine frame plate 17.2 through the rolling wheels 18, one end of the electric telescopic rod 14 is fixedly connected to the ratchet driving plate 10 and the other end of the electric telescopic rod extends out of the hoop rotation plate 11 to be connected to the hoop winding bundling device, the yarn guide roller 15 and the fiber yarn roll 16 are arranged on an end face of one side, close to the ratchet driving plate 10, of the hoop rotation plate 11, the yarn guide roller 15 and the fiber yarn roll 16 are perpendicular to the hoop rotation plate 11, a plurality of yarn guide rollers 15 and a plurality of fiber yarn rolls 16 are arranged on the hoop rotation plate 11 in a circumferential array, and the ratchet driving plate 10 and the hoop rotation plate 11 are provided with a plurality of closed notches; and the electric telescopic rod 14 drives the hoop winding bundling device to extend to a working position, and the ratchet driving plate 10 rotates to drive the electric telescopic rod 14 to push the hoop rotation plate 11 to rotate, so as to drive the hoop winding bundling device to complete hooping winding action.

Figure 9:
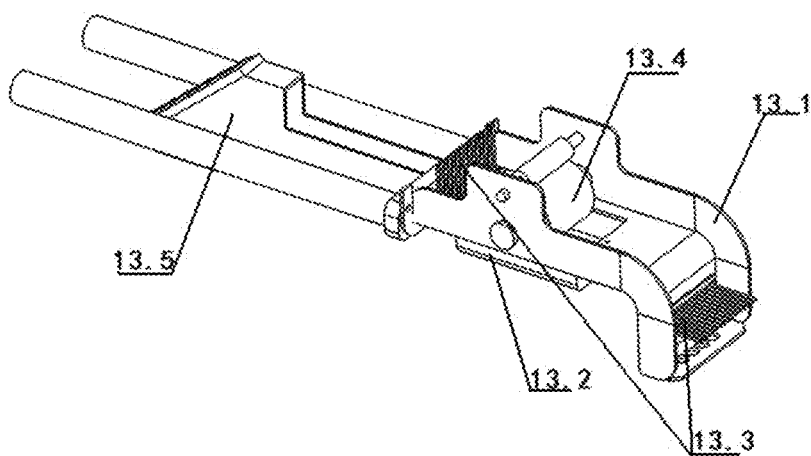
FIG. 9 is a structural schematic diagram of a hoop winding bundling device according to this embodiment.

As shown in FIG. 9, the hoop winding bundling device includes a bundling bracket 13.1, a gum dipping groove 13.2, yarn guide combs 13.3, a gum dipping roller 13.4 and a yarn guide support 13.5, the bundling bracket 13.1 is fixedly connected to one end of the electric telescopic rod 14, two yarn guide combs 13.3 are respectively arranged at a front end and a rear end of the bundling bracket 13.1, a yarn guide hole is formed in a lower part of a front end of the bundling bracket 13.1, the gum dipping roller 13.4 is rotatably arranged on the bundling bracket 13.1, the gum dipping groove 13.2 is formed on the bundling bracket 13.1 below the gum dipping roller 13.4, the yarn guide support 13.5 is fixedly connected to one end, close to the electric telescopic rod 14, of the bundling bracket 13.1, the yarn guide support 13.5 is provided with a yarn guide hole, and fiber tows are transmitted to the yarn guide hole on the yarn guide support 13.5 through the yarn guide roller 15, are split by the yarn guide combs 13.3, are subjected to gum dipping by the gum dipping roller 13.4, and are supplied for hoop winding.

The second transmission gear ring 3, the ring-shaped guide plate 1.1, the gear driving plate 4, the ratchet driving plate 10, the first transmission gear ring 2 and the hoop rotation plate 11 are arranged coaxially and are all provided with circular channels for a high-pressure hydrogen storage vessel to pass through.

Figure 10:
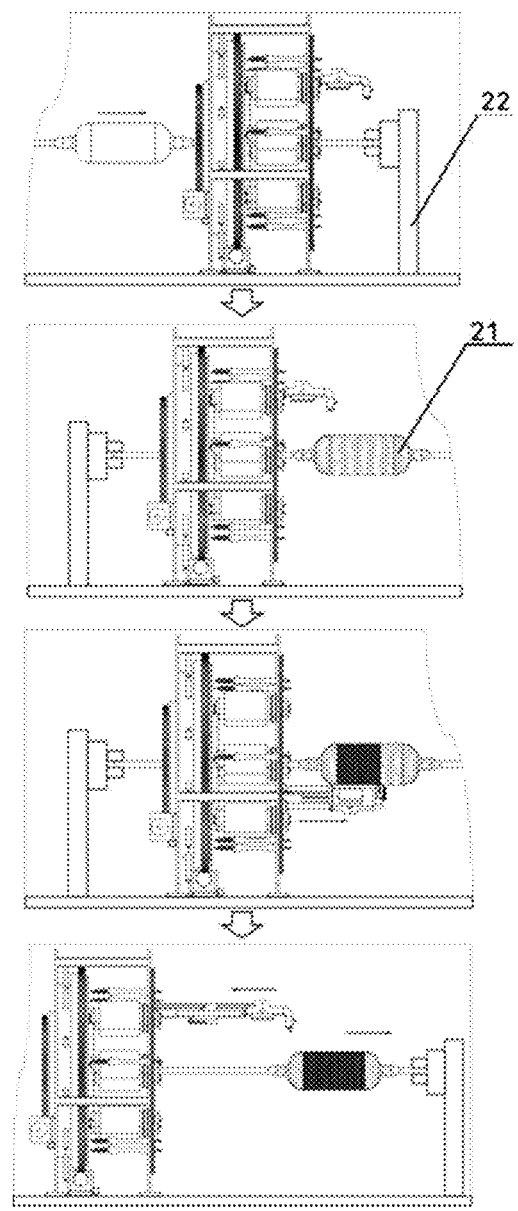
FIG. 10 is a diagram of a working process according to this embodiment.

As shown in FIG. 10, the specific working process is as follows:

1. A hydrogen storage vessel 21 is driven by a hydrogen storage vessel feeding mechanism 22 to perform axial feeding and circumferential rotation; one worm driving assembly drives the first transmission gear ring 2 to rotate, the electromagnetic pressure springs 8 mounted at the forward rotation ratchets 7.1 of the inner ring of the first transmission gear ring 2 drive the forward rotation ratchets 7.1 to be engaged with the gear driving plate 4, and the gear driving plate 4 rotates; the continuous bulbous iris curve sliding rail 4.1 on the gear driving plate 4 drives the sliding rod 5.2 to slide in a radial direction of the guide groove 1.11 of the ring-shaped guide plate 1.1, and the sliding rod 5.2 drives the yarn guide shaft tube 5.1 and the silk outlet head 5.5 to extend out radially until the silk outlet head 5.5 moves radially to a set distance of a seal head section of the hydrogen storage vessel 21; and the worm driving assembly drives the second transmission gear ring 3 to rotate, the gear cylinder 9 fixedly connected to the second transmission gear ring 3 rotates accordingly, the gear cylinder 9 drives the bevel gear 5.4 engaged with the bevel gear to rotate, and the bevel gear 5.4 drives the yarn guide shaft tube 5.1 and the silk outlet head 5.5 that are in key it with the bevel gear to do auto-rotation motion.

2. The hydrogen storage vessel feeding mechanism 22 drives the hydrogen storage vessel 21 to perform axial feeding, and the silk outlet head 5.5 retracts radially and does rotation motion accordingly, so that a fiber tow is attached to a cylinder body of the hydrogen storage vessel 21 according to a certain winding angle; and when the fiber tow is wound to the cylinder body section, the silk outlet head 5.5 stops retraction until the cylinder body section is wound completely, the silk outlet head 5.5 continuously extends out, and winding of a rear seal head section is completed along with the rotation motion. With the axial movement and auto-rotation of the wound hydrogen storage vessel 21, the spiral winding process of the wound hydrogen storage vessel 21 can be completed by reciprocating for three or four times.

3. After the spiral winding of the wound hydrogen storage vessel 21 is completed, it is unnecessary to cut of the spirally wound fiber tow, and the hydrogen storage vessel 21 moves axially to the hoop winding unit; at this time, the electromagnetic pressure springs 8 mounted at the reverse pawls 7.2 in the inner ring of the first transmission gear ring 2 drive the reverse pawls 7.2 to be engaged with the ratchet driving plate 10, the electromagnetic pressure springs 8 at the forward pawls 7.1 de-energized, the forward pawls 7.1 are disengaged from the gear driving plate 4, and the ratchet driving plate 10 rotates; the ratchet driving plate 10 drives the hoop rotation plate 11 to rotate through the electric telescopic rod 14 fixedly connected to the ratchet driving plate, and the hoop rotation plate 11 drives the hoop winding bundling device to rotate; and the wound hydrogen storage vessel 21 is in a static state, and the rotation of the hoop rotation plate 11 cooperates with the axial movement of the electric telescopic rod 14 to complete the hoop winding of the cylinder body section of the hydrogen storage vessel 21 by the hoop winding bundling device.

In this period, the fiber yarn roll 16 on the hoop rotation plate 11 rotates to avoid crossed twisting of the yarn bundles; and the output fiber tow is transmitted to the yarn guide hole on the yarn guide bracket 13.5 through the yarn guide roller 15 and is transmitted to the hoop winding bundling device along the axial direction of the electric telescopic rod 14, is split by the yarn guide comb 18.3 to prevent the fiber yarn bundles from mixed together, is subjected to gum dipping by the gum dipping roller 13.4, is converged into a bundled fiber yarn bundle and is provided to hoop winding. After hoop winding is completed, the electric telescopic rod 14 drives the hoop winding bundling device to retract and the system stops working.

The above is only the preferred specific embodiments of the present invention, but the protection scope of the present invention is not limited to this. Any A changes or substitutions that may be easily conceived by those skilled in the art within the technical scope disclosed by the present invention should be covered within the protection scope of the present invention. Therefore, the protection scope of the present invention should be subjected to the protection scope of the claims.

What is claimed is:

1. Equipment for manufacturing high pressure hydrogen storage containers by spiral winding of multiple bundles of fibers, comprising a spiral winding unit, a hoop winding unit, and a guide base and a supporting base for supporting the spiral winding unit and the hoop winding unit, wherein the guide base comprises a ring-shaped guide plate and a ring-shaped cylinder that are coaxially and fixedly connected to each other, the supporting base is anchored on the ground and comprises a first machine frame plate and a second machine frame plate that are arranged oppositely, the first machine frame plate and the second machine frame plate are provided with circular channels that are arranged coaxially, and an end face of one side of the ring-shaped guide plate is fixedly connected to an inner side of the first machine frame plate;

the spiral winding unit comprises a first transmission gear ring, a second transmission gear ring, a gear driving plate, and a plurality of fiber feeding mechanisms arranged along a circumferential array of the ring-shaped guide plate, each of the fiber feeding mechanisms comprises a yarn guide shaft tube, a sliding rod, a limiting bearing, a bevel gear, a silk outlet head and a limiting tube, the ring-shaped guide plate is provided with several guide grooves for the yarn guide shaft tube to slide in a radial direction of the ring-shaped guide plate, the yarn guide shaft tube is axially provided with a key groove in sliding fit with the bevel gear, the bevel gear is in key connection with the yarn guide shaft tube and located on an inner side of the ring-shaped guide plate, an outer ring of the limiting bearing is fixed at an inner side end of each of the guide grooves, one end of the bevel gear is fixedly connected to an inner ring of the limiting bearing, the yarn guide shaft tube is arranged in each of the guide grooves and is movably connected to the inner ring of the limiting bearing, the limiting tube is arranged at a middle part of the yarn guide shaft tube, the sliding rod is fixedly connected to the limiting tube, the yarn guide shaft tube is axially fixed relative to the limiting tube and rotates circumferentially, the silk outlet head is connected to a front end of the yarn guide shaft tube, and each of the first transmission gear ring and the second transmission gear ring is driven by a driving mechanism to rotate;

an end face of one side, away from the first machine frame plate, of the ring-shaped guide plate is rotatably connected to the first transmission gear ring through a rotary supporting base, the gear driving plate is rotatably arranged on the ring-shaped cylinder and located on an inner side of the first transmission gear ring, a plurality of forward rotation pawls and electromagnetic pressure springs are arranged on one side, in fit with the gear driving plate, of an inner ring of the first transmission gear ring at intervals in a circumferential direction, an outer gear ring of the gear driving plate is in fit transmission with the first transmission gear ring through the forward rotation pawls, the forward rotation pawls are capable of being engaged with or disengaged from the gear driving plate under the action of the electromagnetic pressure springs, an end face of the gear driving plate is provided with a continuous bulbous iris curve sliding rail, and the sliding rod extends into the sliding rail and is capable of driving the yarn guide shaft tube to slide radially along with the rotation of the gear driving plate; the second transmission gear ring is located on an outer side of the first machine frame plate, an end face of the second transmission gear ring is fixedly connected to a gear cylinder, the gear cylinder is rotatably connected to the ring-shaped guide plate through a supporting bearing, the supporting bearing is located on an end face of one side, away from the first transmission gear ring, of the ring-shaped guide plate, one end, away from the second transmission gear ring, of the gear cylinder is provided with a gear ring engaged with the bevel gear, and the bevel gear is capable of driving the yarn guide shaft tube to do auto-rotation motion along with the rotation of the second transmission gear ring;

the hoop winding unit comprises a ratchet driving plate, a hoop rotation plate, a T-shaped sleeve, a hoop winding bundling device, an electric telescopic rod, a yarn guide roller and a fiber yarn roll, the ratchet driving plate is rotatably arranged on the ring-shaped cylinder and is spaced from the gear driving plate through the T-shaped sleeve, the hoop winding unit and the spiral winding unit share one first transmission gear ring, a plurality of reverse rotation pawls and electromagnetic pressure springs are arranged on one side, in fit with the ratchet driving plate, of an inner ring of the first transmission gear ring, a gear ring on an end face of the ratchet driving plate is in fit transmission with the first transmission gear ring through the reverse rotation pawls, and the reverse rotation pawls are capable of being engaged with or disengaged from the ratchet driving plate under the action of the electromagnetic pressure springs; and several rolling wheels are arranged at the periphery of the circular channel of the second machine frame plate in a circumferential array, the hoop rotation plate is rotatably connected to an outer side of the second machine frame plate through the rolling wheels, one end of the electric telescopic rod is fixedly connected to the ratchet driving plate and the other end of the electric telescopic rod extends out of the hoop rotation plate to be connected to the hoop winding bundling device, the yarn guide roller and the fiber yarn roll are arranged on an end face of one side, close to the ratchet driving plate, of the hoop rotation plate, the electric telescopic rod drives the hoop winding bundling device to extend to a working position, and the ratchet driving plate rotates to drive the electric telescopic rod to push the hoop rotation plate to rotate, so as to drive the hoop winding bundling device to complete hooping winding action;

the hoop winding bundling device comprises a bundling bracket, a gum dipping groove, yarn guide combs, a gum dipping roller and a yarn guide support, the bundling bracket is fixedly connected to one end of the electric telescopic rod, two yarn guide combs are respectively arranged at a front end and a rear end of the bundling bracket, a yarn guide hole is formed in a lower part of a front end of the bundling bracket, the gum dipping roller is rotatably arranged on the bundling bracket, the gum dipping groove is formed on the bundling bracket below the gum dipping roller, the yarn guide support is fixedly connected to one end, close to the electric telescopic rod, of the bundling bracket, the yarn guide support is provided with a yarn guide hole, and fiber tows are transmitted to the yarn guide hole on the yarn guide support through the yarn guide roller, are split by the yarn guide combs, are subjected to gum dipping by the gum dipping roller, and are supplied for hoop winding.

2. The equipment for manufacturing high pressure hydrogen storage containers by spiral winding of multiple bundles of fibers according to claim 1, wherein one end of the limiting tube extends inwards to form a limiting clamping ring, and a ring-shaped groove is formed at a position, corresponding to the limiting clamping ring, of the yarn guide shaft tube.

3. The equipment for manufacturing high pressure hydrogen storage containers by spiral winding of multiple bundles of fibers according to claim 1, wherein the bevel gear and the inner ring of the limiting bearing are fixed through a connecting sleeve, and yarn guide channels are formed in the yarn guide shaft tube and the silk outlet head and communicate with each other.

4. The equipment for manufacturing high pressure hydrogen storage containers by spiral winding of multiple bundles of fibers according to claim 1, wherein the yarn guide roller and the fiber yarn roll are perpendicular to the hoop rotation plate, a plurality of yarn guide rollers and a plurality of fiber yarn rolls are arranged on the hoop winding rotation plate in a circumferential array, and the ratchet driving plate and the hoop rotation plate are provided with a plurality of closed notches.

5. The equipment for manufacturing high pressure hydrogen storage containers by spiral winding of multiple bundles of fibers according to claim 1, wherein the second transmission gear ring, the ring-shaped guide plate, the gear driving plate, the ratchet driving plate, the first transmission gear ring and the hoop rotation plate are arranged coaxially and are all provided with circular channels for a high-pressure hydrogen storage vessel to pass through.

6. The equipment for manufacturing high pressure hydrogen storage containers by spiral winding of multiple bundles of fibers according to claim 1, wherein driving mechanisms of the first transmission gear ring and the second transmission gear ring are worm driving assemblies; each of the worm driving assemblies comprises a worm, a servo motor and a carrying base; and the carrying base at the worm engaged with the first transmission gear ring is anchored on the ground, and the carrying base at the worm engaged with the second transmission gear ring is fixedly connected to an outer wall of the first machine frame plate.

7. The equipment for manufacturing high pressure hydrogen storage containers by spiral winding of multiple bundles of fibers according to claim 1, wherein an outer ring of the rotary supporting base is fixedly connected to the first transmission gear ring, and an inner ring of the rotary supporting base is rotatably connected to the ring-shaped guide plate through a driving gearing.

\* \* \* \* \*